July 10, 1923.

W. G. BATE

SPARE TIRE COVER FOR AUTOMOBILES

Filed Sept. 4, 1920

1,461,021

Inventor:
W. G. Bate
by
Thurston Kwis &
Hudson
attys.

Patented July 10, 1923.

1,461,021

UNITED STATES PATENT OFFICE.

WARWICK G. BATE, OF NEWTON FALLS, OHIO.

SPARE-TIRE COVER FOR AUTOMOBILES.

Application filed September 4, 1920. Serial No. 408,158.

*To all whom it may concern:*

Be it known that I, WARWICK G. BATE, a citizen of the United States, residing at Newton Falls, in the county of Trumbull and State of Ohio, have invented a certain new and useful Improvement in Spare-Tire Covers for Automobiles, of which the following is a full, clear, and exact description.

This invention relates to a spare tire cover for use on automobiles and has for its chief object the provision of a cover, preferably formed of water-proof material which can be easily placed over and around a spare tire usually supported at the rear of the automobile, and one which, when placed about the tire and drawn taut over the same, will present a neat appearance and will be smooth surfaced, substantially free at the periphery of puckering and wrinkles.

Further, the invention aims to provide a tire cover formed in such a way that it will completely cover the front and the periphery of the tire and all or the major portion of the rear side of the tire, with the opening within the tire closed by the front face of the cover in such a way that the flat surface thus presented can be used as a carrier for advertising matter.

The present invention resides particularly in the details of construction of the cover by which all the above objects are attained in a very effective manner.

Figure 1:
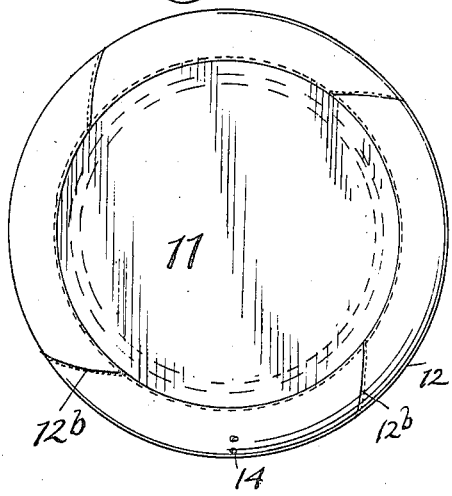
Figure 2:
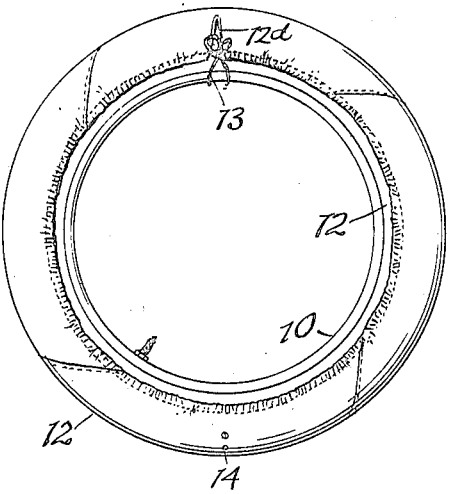
Figure 2:
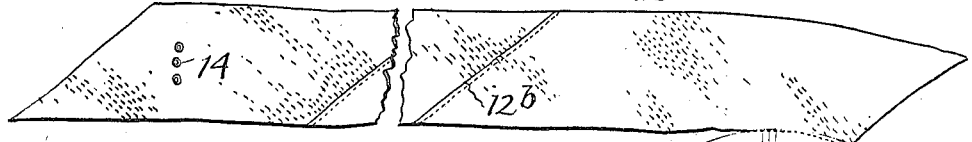
Figure 3:
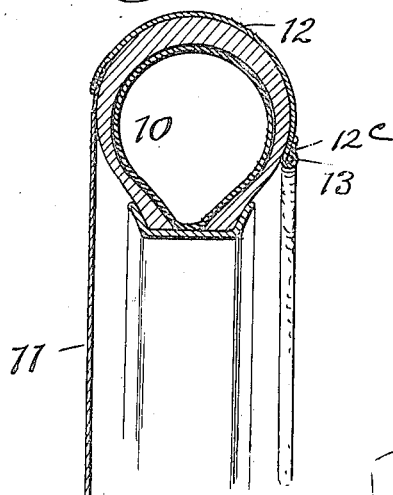
Figure 4:
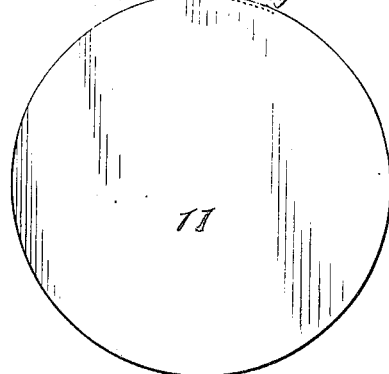
Figure 5:
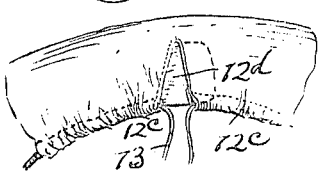

In the accompanying sheet of drawings, showing the preferred embodiment of my invention, Fig. 1 is a face view of the cover applied to a spare tire; Fig. 2 is a rear view of the same; Fig. 3 is a transverse sectional view;

Fig. 4 is a diagrammatic view illustrating the manner in which the tire cover is formed, and especially the manner in which what may be termed the peripheral portion is formed and secured to the body portion in such a manner that the peripheral portion will have a stretching action when placed around the tire and drawn taut at the rear; and Fig. 5 is a detail view.

Referring now to the drawings, 10 represents a tire which is designed to be enclosed by my improved cover. The tire cover which is adapted to be fitted on and to enclose the tire 10 may be formed of any suitable material, I prefer to form it of a durable woven fabric which has been suitably treated with rubber or other composition to render it water-proof. I have used to advantage what is known as unglazed oil-cloth, although cravenetted and possibly rubberized cloth can be used to advantage. However, any other suitable materials which answer requirements may be employed.

The spare tire cover includes a circular front or body portion 11, preferably cut from one piece of fabric and additionally it includes a rim or peripheral portion 12, designed to fit around the body of the tire. It is in the construction or manner of forming this peripheral portion 12 that the invention resides particularly.

I found by experiment that unless there is a considerable stretching action in the part 12 as it is fitted around the tire, the cover if made to right size for a given sized tire cannot be applied to the tire without great difficulty, and when applied the fabric puckers on the rear side and over a part of the periphery to such an extent that the cover is unsightly. To avoid these difficulties and objections the peripheral portion 12 of the cover is made from bias cut fabric,— that is to say, to form this portion the material is cut in sections 12ª of the proper width but on the bias and the bias cut sections are sewed or otherwise united end to end as shown at 12ᵇ so as to form a strip of sufficient length to extend circumferentially around the tire. As shown in Fig. 4, this strip is then sewed along one edge to the marginal part of the circular portion 11 of the cover.

The edge of the strip opposite that which is sewed to the circular portion 11 is hemmed, forming at the free edge of the portion 12 an encasement 12ᶜ for a draw-string 13. At the point where the ends of the draw-string protrude from the cover a suitably reinforced V-shaped notch 12ᵈ is cut so that when the cover is applied to the tire and the draw-string is drawn taut, the cover closely encircles the tire, and in view of the fact that the peripheral portion 12 is formed of bias cut fabric, the part which extends about the extreme outer portion of the tire stretches so that notwithstanding the fact that the hem containing the draw-string is a considerable distance inward at the rear side from the maximum diameter of the tire, very little and a minimum of puckering of the fabric takes place.

It will be understood that for a tire of given size the cover is formed in such size that the outer or peripheral portion 12 is stretched to apply it to the tire in order that the results above described may be obtained. Otherwise the cover will not properly fit the tire, and when applied will not be attractive in appearance.

If desired, the V-shaped notch 12$^d$ may be covered by a flap such as shown at 12$^e$, this flap being on the inner side of the cover.

It might be mentioned that when the cover is in place on the tire the entire space within the tire proper, also the periphery of the tire and all, or the major portion of the rear side of the tire are completely enclosed, the cover preferably extending inwardly on the rear side to substantially the rim portion of the tire, though the extent to which it extends inwardly on the rear side can be varied by changing the width of the strip forming portion 12 of the cover. It will be noted, of course, that the further the cover is extended inwardly on the rear side, the smaller the circumference becomes at the draw-string as compared with the circumference at the periphery of the tire, and the greater the puckering.

In my improvement by having the draw-string located inwardly about opposite the rim portion of the tire there is sufficient stretching at the periphery proper to avoid all material puckering.

I prefer to provide in the peripheral or rim portion 12 of the cover, a series of drainage openings 14 which can be formed by inserting eyelets in the fabric, and when the cover is placed on the tire these drainage openings will be at the bottom.

When the cover is in place a flat surface of fabric extends across and completely encloses the normally open space within the tire. This forms a very good carrier for advertising matter which can be placed on the circular body portion 11. This, of course, is not an essential characteristic or function of the portion 11.

Having described my invention, I claim:

1. A cover for a spare tire comprising a circular piece of material, a strip of bias cut fabric attached to the periphery of said circular portion to form a part which is adapted to be extended over and around to the rear of the tire, and means carried by the free edge of said strips, for stretching said strip about the tire and for securing it against removal therefrom.

2. A cover for a spare tire comprising a circular body portion and a rim or peripheral portion formed of bias cut fabric sewed along one edge to the periphery of the body portion, and a draw-string at the opposite edge of said rim or peripheral portion whereby said last named portion can be stretched about the tire and drawn taut at the rear side thereof.

In testimony whereof, I hereunto affix my signature.

WARWICK G. BATE.